Figure 1:
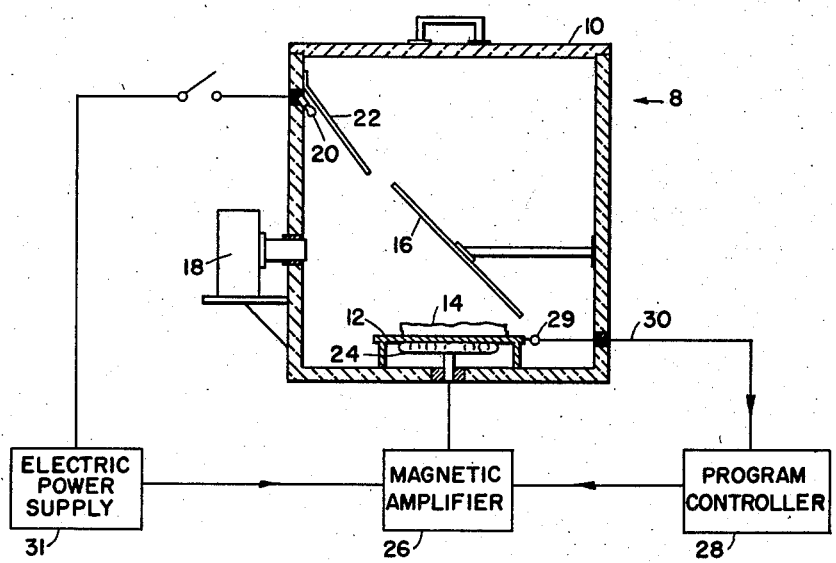

Aug. 11, 1959

D. R. LEWIS 2,899,558

METHOD OF CHARACTERIZING SOLID MATERIALS
AND METHOD OF GEOPHYSICAL EXPLORATION

Filed Jan. 22, 1957

INVENTOR
DONALD R. LEWIS
BY
HIS ATTORNEY

United States Patent Office 2,899,558
Patented Aug. 11, 1959

2,899,558

METHOD OF CHARACTERIZING SOLID MATERIALS AND METHOD OF GEOPHYSICAL EXPLORATION

Donald R. Lewis, Houston, Tex., assignor to Shell Development Company, New York, N.Y., a corporation of Delaware Application January 22, 1957, Serial No. 635,165

5 Claims. (Cl. 250—65)

The present invention relates to a method of characterizing materials and pertains, more particularly, to a method of characterizing solid materials that exhibit non-uniform thermoluminescence.

Thermoluminescence is a complex phenomenon exhibited by materials which are poor conductors of electricity and are also capable of acquiring trapped electrons which, upon thermal excitation, are released from their traps and emit light energy as they they return to a lower energy level.

Heretofore, attempts have been made to characterize some materials such as, for example, catalysts, zinc sulfide phosphors and the like, by producing glow-curves of their thermoluminescence. In carrying out this technique, it is the practice to heat a crushed sample of the material to a constant temperature or with a continuously rising temperature while the intensity of the radiation emitted by the sample as a whole is measured and plotted against time and/or temperature. The sample material may then be characterized in a limited manner by correlating the glow-curve with the known properties or characteristics of the sample material or with the glow-curves of other samples or materials. However, this technique necessarily depends upon the total emission of each sample, and for this and other reasons, the evidence attainable thereby falls short of that which now may be gained by practicing the method of the present invention.

It has been found that in the case of many solid materials, including numerous rock and earth formations, the total thermoluminescence emitted by a sample of the material (such as that which might have been recorded as a glow-curve) is actually the result of non-uniform thermoluminescence or radiation of different intensities emitted from the sample at different points. The present invention utilizes the phenomenon of non-uniform thermoluminescence and is based on the discovery that the non-uniform thermoluminescence exhibited by these materials can be established as descriptive patterns which are uniquely characteristic of the solid materials and which may be employed as a means on the basis of which the materials can be analyzed, evaluated, identified, distinguished or otherwise characterized.

In accordance with the present invention, the non-uniform thermoluminescence patterns exhibited by earth and rock formations are used in geophysical (the definition of the term "geophysical" including within its scope the term "geological" for the purposes of the present invention) exploration for identifying, distinguishing or otherwise characterizing earth or rock formations. For example, in an earth or rock sample taken from an outcropping or subsurface formation, the number and kinds of electron traps and the number of electrons occupying them which influence the pattern exhibited by the sample, depend in turn upon the character and the geological and geophysical history of the sample, for example, its radiation experience, the character of any impurities present, and whether the sample has been subjected to thermal or mechanical forces etc. capable of causing lattice imperfections in the solid materials of which the sample consists or otherwise affecting the formation from which the sample was obtained. Thus, the non-uniform thermoluminescence patterns exhibited by the sample may provide evidence relating to its history, its chemical and physical properties, etc. on the basis of which the formation can be identified, distinguished or otherwise characterized. In many instances, it has been found that chemically similar earth or rock samples which exhibit substantially identical glow-curves can be clearly differentiated since those glow-curves are the result of different impurity introducing conditions, or different mechanical or radiant energy conditions which had affected the materials and caused them to exhibit different non-uniform thermoluminescence patterns. Moreover, the pattern exhibited by a formation may give information which was unobtainable by methods employed heretofore. For example, samples of two dolomites having similar glow-curves and being otherwise indistinguishable by methods used heretofore may be revealed by their non-uniform thermoluminescence patterns to have been formed from limestone containing different fossil remains.

Accordingly, while a general object of the present invention is to provide a new and improved method of analyzing, evaluating or otherwise characterizing solid materials that exhibit non-uniform thermoluminescence, a more particular object is to provide a new and improved method of geophysical exploration by means of which different geological formations can be investigated, identified, distinguished or otherwise characterized on the basis of the patterns of their non-uniform thermoluminescence.

Figure 2:
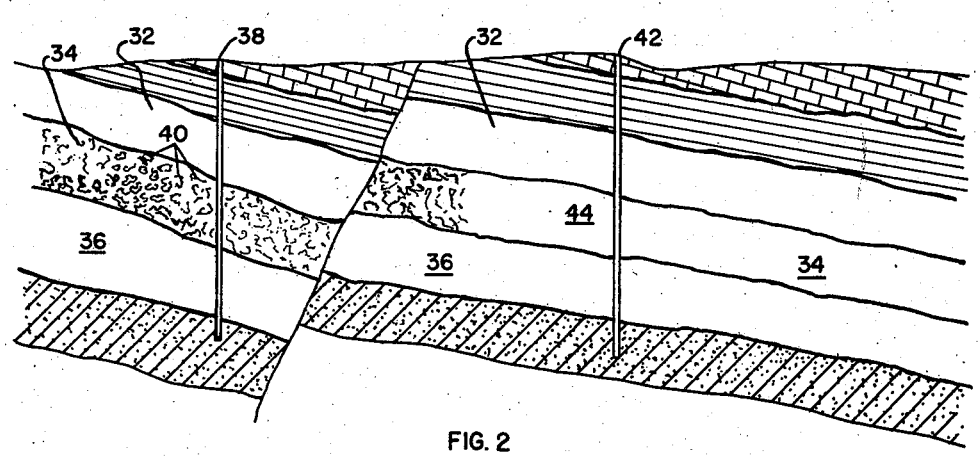

These and other objects and advantages of the present invention will be understood from the following description taken with reference to the attached drawings wherein:

Fig. 1 is a diagrammatic view illustrating one embodiment of the apparatus which may be used to practice the method of the present invention; and, Fig. 2 illustrates one example of a geological problem which now can be solved by practicing the method of the present invention.

In accordance with the present invention, the image and pattern of the non-uniform thermoluminescence emitted by a material is preferably recorded by exposing a light sensitive medium to the light emitted from a sample of the material. The light sensitive medium may be, for example, any suitable black and white or color photographic film, and the image recorded thereby is subsequently referred to as an auto-thermoluminescence or A.T.L. photograph or image.

In cases where the light emitting temperature of the sample is near room temperature or below, the image may be recorded by placing the sample in a light tight chamber and exposing the film by placing it adjacent to a selected surface of the sample. Preferably, however, the image is photographed by a camera and the apparatus used may be that diagrammatically shown in Fig. 1 and embodying a light tight box 8 including: a removable cover 10, a plate 12 for supporting and heating a sample 14; a front surfaced mirror 16 disposed at a suitable angle with respect to the upper surface of the sample and the lens of a camera 18 for presenting to the camera a reflected image of the thermoluminescent light emitted by the sample; a light source 20 providing a means for illuminating the sample with reflected light, for example, white light provided by an incandescent lamp; and a shield 22 for preventing light from the source 20 from being reflected to the sample from the mirror.

The mirror 16 is provided in order that the camera may be positioned away from the path of the heat rising from the plate 12, and the light source 20 permits the sample to be photographed under reflected light for a purpose as subsequently described. The plate 12 may be formed of a suitable metal or a ceramic material which does not emit light when heated to temperatures below approximately 600° C. The sample receiving surface of the plate 12 is uniformly heated by an element 24 energized by any desired source of electric power. In some cases, it may be preferred to use a heating system such as shown in Fig. 1, which system comprises a magnetic amplifier 26 which is controlled by any suitable program controller and temperature indicator 28 made responsive to the temperature of the plate by a thermocouple 29 connected to the controller 28 by a lead 30. Any suitable electric power source 31 may be provided for energizing the amplifier and the light source 20. Preferably, the controller 28 is of a type which can be set to raise the temperature of the sample at a selected uniform rate and/or maintain the sample at a predetermined temperature. Alternatively, the element 24 can be energized from a variable voltage supply, the temperature being determined as a function of the voltage. The operation of the apparatus is thought to be obvious and accordingly it is noted only in connection with the method of the present invention as subsequently described.

Whether a material can be characterized by the method of the present invention depends upon whether it exhibits a recordable amount of non-uniform thermoluminescence at a temperature below the critical temperature at which the material undergoes a change preventing the production of a recordable pattern or image, for example, a temperature at which the material melts, decomposes with a loss of structure, or emits an appreciable amount of incandescent light. However, some materials which decompose to form a solid ash or the like, having a structure representative of the undecomposed material, for example certain cellulosic fibers, can be characterized by the non-uniform thermoluminescence patterns of their decomposition products. Also, materials which melt or decompose to formless decomposition products above room temperature can be characterized by irradiating the materials with electron exciting rays at a low temperature, such as the freezing point of Dry Ice, and heating the irradiated materials to a temperature at which they are stable solids, such as room temperature, to establish the arrangement and nature of their thermoluminescence under conditions suited to the particular materials.

A determination can be made experimentally by irradiating samples of a material with varying amounts of electron exciting rays such as gamma rays emitted, for example, from a gamma ray irradiator using a cobalt-60 pile produced isotope as the radiator source, or X-rays or other ionizing radiation; heating the samples through a suitable temperature range; and determining visually or by means of A.T.L. photographs which samples exhibit recordable amounts of non-uniform thermoluminescence.

Conditions under which materials exhibit a recordable amount of non-uniform thermoluminescence vary widely depending upon the character of the materials. Also, emittance temperatures may vary in the same material. For example—rock salt was found to exhibit a strong thermoluminescence when heated to room temperature after being subjected to gamma or X-ray irradiation at about −75° C. When further heated to 100° C. after the same irradiation, the rock salt was found to exhibit a much smaller amount of thermoluminescence.

The minimum conditions under which a material exhibits recordable non-uniform thermoluminescence including the amount of ionizing radiation, the temperature at which the material is irradiated, and the temperature at which or the temperature range through which the material is heated, are hereinafter referred to as the minimum pattern producing conditions. The conditions under which a material exhibits the most non-uniform thermoluminescence are hereinafter referred to as the optimum pattern producing conditions.

While the temperatures required to determine the minimum and optimum pattern producing conditions vary widely and may fall well below 0° C. in some cases, it has been found that a temperature span ranging from room temperature or about 20° C. to about 600° C. is usually sufficient and for most purposes the apparatus illustrated in Fig. 1 may be used to make the determinations.

Briefly, in making a determination, samples of the material under consideration are first subjected to different amounts of irradiation under various selected temperature conditions. Each sample is then heated to a selected temperature while an A.T.L. photograph is taken recording the non-uniform thermoluminescence exhibited by the sample. By comparing the recorded patterns or images exhibited by each sample, the minimum and optimum pattern producing conditions of the material can then be determined. In taking the A.T.L. photographs, the plate 12 is preferably preheated to some selected temperature falling between, for example, 20° C. to about 600° C. Each sample is disposed on the preheated plate and the camera shutter is opened in the absence of light while the sample is heated to the selected temperature. Alternatively, the box 8 can be provided with a shuttered window through which the sample can be observed whereby a visual determination can be made. In this case the temperature controller preferably is set to heat each sample at a uniform rate through a suitable temperature range, say for example, from room temperature to about 600° C. The minimum and optimum pattern producing conditions can then be determined by observing the relative amounts of non-uniform thermoluminescence exhibited by the samples as well as the emittance temperature or temperatures of each sample. If desired, A.T.L. photographs can be taken while the visual determination is made.

In characterizing a material according to the present invention, the material first is tested to determine the conditions under which it exhibits a recordable amount of non-uniform thermoluminescence. This may be done by testing samples of the material as previously described. A sample of the material is then subjected to it least the minimum pattern producing conditions and an A.T.L. photograph is taken recording the image of the non-uniform thermoluminescence exhibited by the material. By then correlating or orienting the image with properties of the sample which are related to and affect the image, a descriptive pattern of the non-uniform thermoluminescence can be established on the basis of which the material can be characterized to provide a reference against which the patterns of other materials or materials of the same type can be compared for the purpose of analyzing, evaluating, identifying, distinguishing or otherwise characterizing the materials.

The pattern of the non-uniform thermoluminescence includes the size and shape of each thermoluminescence emitting spot or area the relative intensity of the light emitted from each spot, the color of the light, and the distribution of the spots with respect to each other and the sample as a whole. The relative intensity of the radiation emitted from the various spots as well as the size and shape of the spots can be determined from the A.T.L. photograph, the spots of greatest intensity appearing as the darkest spots on the negative and, of course, as the lightest spots on the positive. The color of the emitted radiation can be recorded by taking an A.T.L. photograph of the sample with color film. The distribution of the spots with respect to the sample can best be determined by orienting the A.T.L. image of the sample with an ordinary light image of the sample. The orientation is preferably accomplished by superimposing the A.T.L. photograph on the reflected light photograph taken using the light source 20 and while the sample is still in the same position.

In accordance with the present invention, the patterns of non-uniform thermoluminescence exhibited by materials are employed for various purposes such, for example, as a means for: evaluating the chemical activity or performance of materials, determining the uniformity of composition of materials, or for identifying, distinguishing or otherwise characterizing earth or rock formations.

In making an evaluation of the efficiency or activity of solid catalysts such as Silica-Alumina catalysts and other petroleum cracking catalysts which exhibit a recordable amount of non-uniform thermoluminescence, a first A.T.L. photograph is taken under predetermined conditions to record and establish the pattern of the non-uniform thermoluminescence exhibited by the beads of a previously prepared catalyst of the same type and of known and acceptable efficiency. The conditions under which this photograph is taken can be experimentally determined in the manner previously noted and embody at least the minimum pattern producing conditions of the previously prepared catalyst, the optimum pattern producing conditions preferably being utilized. Preferably, at least one other A.T.L. photograph is taken under the same pattern producing conditions to record and establish the pattern exhibited by the beads of another previously prepared catalyst of the same type having a known lack of efficiency. These two A.T.L. photographs are then used as references against which an A.T.L. photograph recording the pattern of non-uniform thermoluminescence exhibited by a sample of the newly prepared catalyst, taken under the same conditions, is compared. On the basis of this comparison, the efficiency of the newly prepared catalyst is evaluated and forecast. If desired, and as an aid in establishing the pattern exhibited by the catalyst beads, the recorded A.T.L. images of the beads may be physically oriented or matched with the structure of the beads by the use of ordinary light images as previously described.

In determining the uniformity of composition of a material which exhibits non-uniform thermoluminescence, an A.T.L. photograph is taken recording the image of a sample of the material having a known composition of an acceptable quality. A pattern of the thermoluminescence is then established by orienting or matching the image with the structure of the sample material, for example, by matching the A.T.L. image with an ordinary light image of the sample. The recorded pattern is then used as a reference against which the A.T.L. patterns exhibited by other samples of the material, under the same pattern producing conditions, can be compared and by means of which their uniformity of composition can be determined. Thus, for example, the method of the present invention can be applied for determining the uniformity of composition of: optical materials such as glass or quartz; phosphors for television or radar screens; a batch of catalytic material; medicines; or other materials where uniformity of composition is important.

In practicing the method of the present invention as a method of geophysical exploration, A.T.L. photographs of the nonuniform thermoluminescence exhibited by earth and rock formations are taken in the manner previously described.

In most cases, portions of the formations are obtained by coring, and, preferably, the cores are sliced into sections or samples having a pair of parallel faces and a thickness of about 1 mm. If possible, at least one face is rough ground and polished, and the sample is arranged on the plate 12 with this face disposed upwardly when an A.T.L. photograph is taken.

Each sample or formation can be characterized in various ways on the basis of its recordable non-uniform thermoluminescence. Since many rock and earth formations have been exposed to an appreciable amount of radiation while in their natural state, A.T.L. photographs can often be and are preferably taken from samples of these formations prior to subjecting them to irradiation in the laboratory. This can be done in the manner previously noted by heating a sample through a suitable temperature range while taking an A.T.L. photograph recording the image and the nature and arrangement of the emitted thermoluminescence. This type of image is subsequently referred to as the natural A.T.L. photograph or image of a formation as distinguished from the irradiated A.T.L. photograph or image exhibited by a sample after it has been irradiated in the laboratory. The effect on either type of image of radioactive inclusions in a sample can be learned by placing the sample in contact with a nuclear track plate and comparing the plate with the A.T.L. photographs.

Once a material has emitted its thermoluminescent radiation, it can be reactivated by re-subjecting it to ionizing radiation. In the case of rock samples this is preferably gamma ray radiation. Thus, after its natural image has been recorded, the sample is tested to determine its minimum and optimum pattern producing conditions and a second A.T.L. photograph is taken, preferably under the optimum pattern producing conditions, with the sample arranged on the plate 12 in its original position to record an irradiated image of its non-uniform thermoluminescence. Preferably, while still in the same position, the sample is photographed under white light illumination from the lamp 20 so that the thermoluminescence emitting spots of the sample, as evidenced by its natural and irradiated images recorded by the A.T.L. photographs, can be located and identified on the white light photograph and thereby matched or oriented with properties of the sample itself as an aid in establishing the thermoluminescence patterns of the sample. This can be done, for example, by superimposing the natural and irradiated A.T.L. photographs on the white light photograph. The thermoluminescence patterns of the sample can be further established by orienting or matching the images with the chemical, physical, and/or geological properties of the various thermoluminescence emitting portions of the sample, for example, porosity, strength, water solubility, acid resistance, bedding features, vein structures, mineralogy, etc. By then relating or correlating these properties with certain characteristics of the non-uniform thermoluminescence patterns of the sample, the presence of these characteristics in A.T.L. patterns of images of other formations may be used to detect the existence of, or the absence of, the corresponding chemical, physical or geological properties whereby the other formations can be quickly analyzed, evaluated, identified, distinguished or otherwise characterized.

While the chemical and physical properties of the sample may be determined by methods well known to the art, the A.T.L. photographs of the sample's non-uniform thermoluminescence may also be used as an analytical aid. For example, the A.T.L. photographs may highlight the structural details of the sample, and may show the laminar and bedding features of the parent formation or stratum. These features may be visible in the sample or section itself after their shape and location has been revealed by an A.T.L. pattern.

The distribution of networks of veins and fractures not only in the plane of the surface but also in the body of the sample can often be seen in the A.T.L. photographs. This results from emission of thermoluminescence not only from the plane of the surface but also from various depths in the section depending upon the optical properties of the rocks.

Also, the distribution of minerals in a sample may be seen by taking a color A.T.L. photograph of the sample under at least the minimum pattern producing conditions. For example, the thermoluminescence emitted by feldspar is blue to green, that emitted by calcite is yellow-orange, and dolomite appears as a deep red. Thus, by matching the A.T.L. images of a rock sample with the structure of the sample, the sample can, for example, be characterized by A.T.L. patterns related to the vein structure or bedding features of the rock, or the mineral distribution in the rock. Such patterns can be used in preparing a lithologic and petrographic characterization for identifying the zone or formation from which the sample was obtained.

In accordance with the present invention, the non-uniform thermoluminescence exhibited by samples taken from earth and rock formations can be employed in various ways for identifying, distinguishing, analyzing or otherwise characterizing the formations.

For example, from the moment a crystal in a formation is formed it begins to store up evidence of its radiation history which evidence is recorded by the natural A.T.L. photograph taken from a sample of the formation. The overall average of the inherent and acquired thermoluminescence properties of a formation sample containing the crystal are revealed by glow curves of the sample. The variations of those properties among individual crystals are revealed by the non-uniform thermoluminescence patterns of the sample. Thus, by comparing the patterns of natural thermoluminescence exhibited by different formations, for example, the distribution of the radiation emitting spots and the relative intensities of the radiation emitting spots and the relative intensities of the radiation as evidenced by A.T.L. photographs recording the natural images, the formations can be distinguished on the basis of their radiation histories. In addition, where formations of different geological ages exhibit characteristic natural patterns, the formations can be further distinguished and identified on the basis of their geological ages as evidenced by their natural A.T.L. patterns.

Formations can also be distinguished or identified on the basis of and by comparing their irradiated non-uniform thermoluminescence patterns as recorded by their A.T.L. photographs taken under the same pattern producing conditions.

In addition, the irradiated patterns exhibited by some formations have been found to exhibit characteristic changes under different pattern producing conditions on the basis of which changes the formations can be identified or distinguished.

Through selection of the different known locations from which earth or rock samples are obtained, their properties or patterns of non-uniform thermoluminescence may be employed for various purposes such, for example, as in making geological maps or surveys, stratigraphic correlations, or in well logging for identifying or distinguishing the formations traversed by a borehole, etc. In some geological circumstances the non-uniform thermoluminescence properties exhibited by formations may enable these purposes to be carried out to a greater extent than was heretofore possible. Fig. 2 is a diagrammatic view illustrating one such circumstance and showing strata 32, 34 and 36, the strata 32 and 36 being formed of secondary dolomite from different fossiliferous limestone formations (not shown) while stratum 34 shows the fossiliferous limestone from which the dolomite in this stratum was formed. At borehole 38 the limestone in stratum 34 may be identified by microscopic examination of its fossiliferous structure 40 and stratum 34 may thus be identified and distinguished from strata 32 and 36. However, at borehole 42, which may be located a substantial distance from borehole 38, strata 32 and 36 and the dolomitized portion 44 of stratum 34 may show no relic fabric and may otherwise be indistinguishable by microscopic examination or other means employed heretofore. Also, at borehole 38, the dolomite strata 32 and 36 may be indistinguishable from each other. Thus, at borehole 38 the stratigrapher may be unable to correlate the strata 32 and 36 with their parent limestone formations, and at borehole 42 he may also be unable to correlate the three strata with their parent limestone formations nor even detect the presence of three different dolomite strata. In accordance with the present invention, by comparing the non-uniform thermoluminescence patterns exhibited by samples taken from strata 32 and 36 at borehole 38, these strata can be distinguished. By taking samples at various depths from borehole 42 and comparing their non-uniform thermoluminescence patterns, the three strata can be distinguished and by comparing these patterns with those obtained at borehole 38 the locations of strata 32 and 36 at borehole 42 can be determined and correlated with their locations at borehole 38. Also, it has been found that many fossiliferous limestones exhibit characteristic patterns of non-uniform thermoluminescence, and that in many cases the patterns exhibited by dolomitized limestones clearly show the details of the relic fabric of the limestone from which the dolomite was formed. Thus, by recording the A.T.L. pattern of a sample of the dolomitized limestone portion 44 and comparing the relic fabric revealed in the pattern with the known fabric or fossiliferous structure 40 of the limestone determined by microscopic examination or from an A.T.L. pattern of the limestone, the dolomitized portion 44 can be identified and correlated with its parent limestone formation. In addition, if the fossiliferous structures of the parent limestones of strata 32 and 36 are known, similar identifications and correlations can be made. In characterizing a sample of dolomite having the relic fabric of a limestone preserved therein, the A.T.L. pattern related to the relic fabric is preferably established by matching the A.T.L. image with the structure of the sample.

I claim as my invention:

1. In geophysical exploration, the improvement which comprises characterizing a formation on the basis of its non-uniform thermoluminescence by taking a sample from the formation, heating the sample, and exposing a light sensitive medium to the non-uniform thermoluminescence emitted by the sample due to the inhomogeneity of the sample and using said exposed light sensitive medium to characterize said formation.

2. In geophysical exploration, the improvement which comprises characterizing a formation on the basis of its non-uniform thermoluminescence by taking a sample from the formation, irradiating the sample with ionizing radiation, heating the sample, and exposing a light sensitive medium to the non-uniform thermoluminescence emitted by the sample due to the inhomogeneity of the sample and using said exposed light sensitive medium to characterize said formation.

3. A method of characterizing a solid material on the basis of its non-uniform thermoluminescence comprising the steps of: irradiating the material with ionizing radiation, heating the material, and detecting the nature and arrangement of the non-uniform thermoluminescence emitted from the material due to the inhomogeneity of the material and using said detected non-uniform thermoluminescence to characterize the material.

4. A method of characterizing a solid material on the basis of its non-uniform thermoluminescence comprising the steps of: irradiating the material with ionizing radiation, heating the material, and exposing a light sensitive medium to the non-uniform thermoluminescence emitted by the material due to the inhomogeneity of the material and using said exposed light sensitive medium to characterize the material.

5. A method of characterizing a plurality of similar materials comprising: taking a sample of each material heating each sample to release the thermoluminescence of each sample due to the inhomogeneity of the sample; recording the intensity and distribution of the thermoluminescence so released and then comparing the recordings of the plurality of samples to determine differences in the intensity and location of the released thermoluminescence in order to characterize the samples.

References Cited in the file of this patent

UNITED STATES PATENTS

| | | |
|---|---|---|
| 2,451,883 | Squires | Oct. 19, 1948 |
| 2,459,512 | Fash et al. | Jan. 18, 1949 |
| 2,551,650 | Urbach | May 8, 1951 |
| 2,573,245 | Boyd et al. | Oct. 30, 1951 |
| 2,775,710 | Ludeman | Dec. 25, 1956 |